Patented July 4, 1939

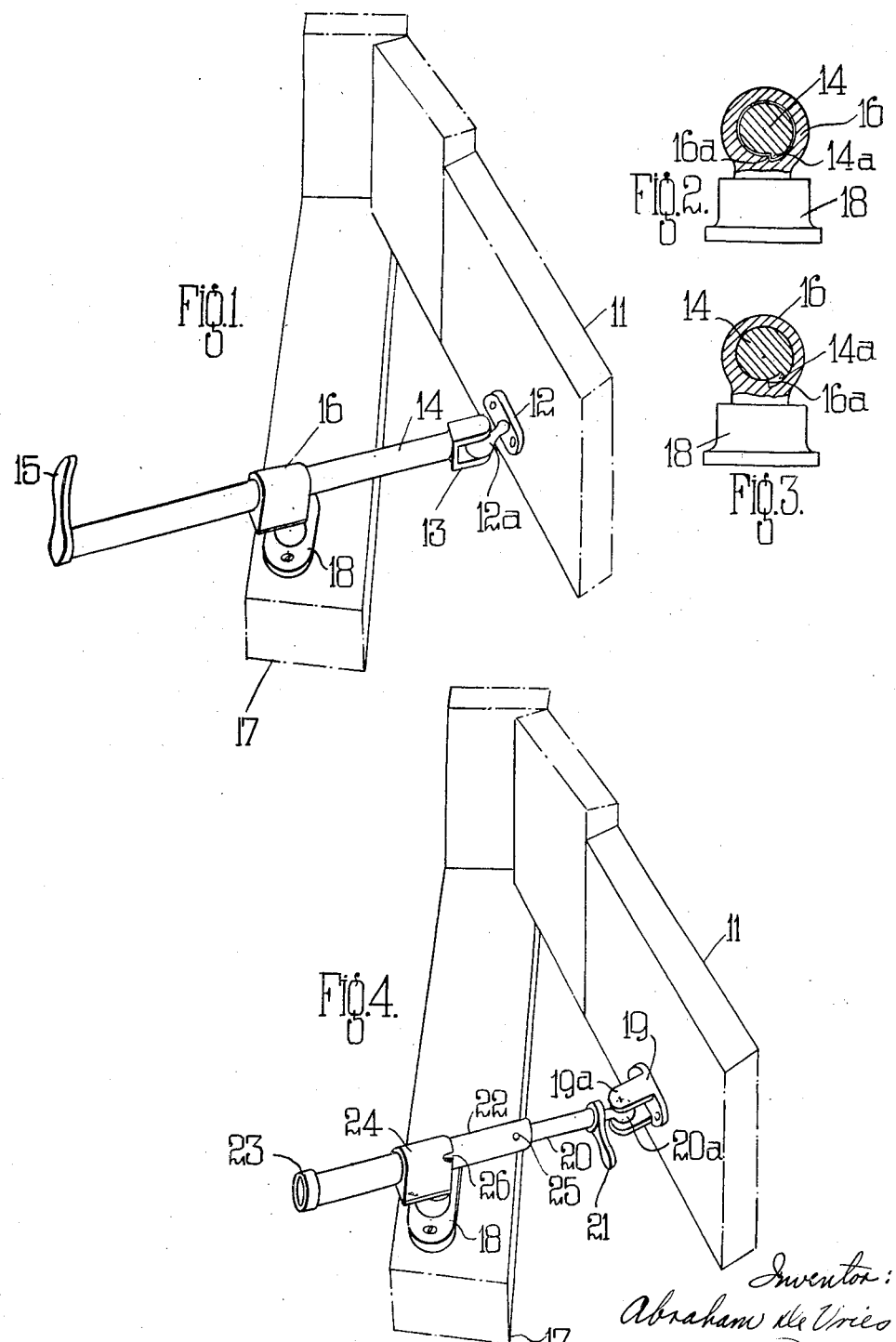

2,164,732

UNITED STATES PATENT OFFICE 2,164,732

STAY FOR WINDOWS OR SIMILAR CLOSURES

Abraham de Vries, Amsterdam, Netherlands

Application January 22, 1938, Serial No. 186,426
In Great Britain January 23, 1937

4 Claims. (Cl. 292—275)

The present invention relates to casements, windows, doors and the like closures of the type wherein the closure is maintained in an adjusted position relatively to its fixed supporting frame by a stay which includes at least two members, one of which is slidable longitudinally and within another and is angularly displaced relatively thereto about the common axis of the elements for locking them in a predetermined position.

The object of the present invention is to provide a stay of the above type which, without decreasing its reliability, is stronger and more cheaply manufactured than known stays.

According to the present invention the members of the stay, one of which is connected to the closure and the other of which is pivotally mounted on the window frame, have inter-engaging peripheral faces which in transverse section are eccentric to their common axis and extend along arcs of slightly increasing radii terminating in a radial step whereby on relative angular displacement of the members about their common longitudinal axis from a position in which they are capable of relative longitudinal displacement the two members are locked solidly by frictional engagement between their co-operating faces.

In one form of construction one of the members may be pivoted at one end to the casement or other closure and may extend within a sleeve constituting the other member which is pivoted on the casement frame.

In a modified form of construction the second member is adapted for longitudinal displacement within a tubular bracket pivotally mounted on the frame.

In a still further modified form of construction one of the members is carried by spaced end brackets rigidly secured to the casement or other closure and intermediate its ends passes through a sleeve which in turn carries an annulus which is held thereto by longitudinal displacement and is pivoted by a link to a bracket fixed to the frame of the closure.

The invention is more particularly described with reference to the accompanying drawing, in which:

Figure 1 is a perspective view of a window stay with the window shown in its partially open position, the stay comprising a bar pivoted to the window and a sleeve through which the bar passes and which is pivoted to the window frame.

Figure 2 is a transverse section through the sleeve when the bar and the sleeve are in such relative angular positions as to permit of sliding or longitudinal displacement between them.

Figure 3 is a transverse section through the sleeve when the bar has been angularly displaced relatively to the sleeve to permit of interlocking of the bar and said sleeve for the purpose of maintaining the window in its adjusted open position.

Figure 4 is a perspective view of a modified form of construction.

In the construction illustrated in Figures 1–3 the lower end of a closure such as a window, is shown at 11 and has secured thereto a bracket 12, the arm 12a of which is held between the spaced arms of the bifurcated end 13 of a bar 14. The arrangement is such that the bar 14 may be angularly displaced relative to the frame about a vertical axis passing through the arm 12a of the bracket 12 and may be angularly rotated about its own axis in any position of adjustment of the window or other closure 11.

For example, the spaced arms of the bifurcated end 13 of the bar 14 may have recesses on their opposite faces for engagement by a spherical end of the arm 12a of the bracket as shown in Fig. 1.

The bar 14 carries a handle 15 at its free end and passes through a sleeve 16 which is pivotally mounted for angular displacement about a vertical axis on a bracket 18 secured to a fixed frame 17 to which the closure 11 is pivotally mounted. Where the closure consists of a casement window the part 11 forms the base of the movable sash of the window while the part 17 constitutes the fixed window-sill.

As will be seen in Figures 2 and 3 the external periphery of the bar 14 and the internal periphery of the sleeve 16 when considered in transverse section is formed by an arc of gradually increasing radius with a radial step where the maximum radius of the arcs coincide with the minimum radius.

The radial step on the bar is shown at 14a and a radial step on the sleeve at 16a. In other words the inter-engaging peripheries of the bar and the sleeve when considered in transverse section may be said to constitute part of a spiral formation eccentric to the common axis of the bar and the sleeve.

In the position of the parts shown in Figure 2 the steps 14a, 16a coincide, leaving a slight annular clearance between the bar 14 and the sleeve 16, whereby the relative longitudinal displacement between said bar and said sleeve is permissible in order to open or close the window or to vary its degree of opening.

It will be appreciated that during longitudinal displacement of the bar with the sleeve the bar pivots relatively to the window while the sleeve pivots about its vertical axis on the fixed frame 17.

When the desired degree of opening of the window relatively to the frame 17 has been effected, the handle 15 of the bar 14 is angularly displaced in an anti-clockwise direction into the position shown in Figure 3, i. e., with the step 14a removed to a position away from the step 16a. In this relatively angularly displaced position of the bar 14 within the sleeve 16, the two members are frictionally locked by inter-engagement of their peripheries. In other words the slight play permitting relative longitudinal displacement of the bar and the sleeve is wholly taken up by relative angular displacement bringing the successive parts of the periphery of the bar into engagement with parts of equal radius of the sleeve. In this relative angular position of the bar and the sleeve, further movement of the window 11 relatively to its fixed frame 17 is prevented.

In order to unlock the bar from the sleeve, the handle 15 is rotated in a clockwise direction.

In the modified form of construction illustrated in Figure 4 a bracket 19 is fixed to the window and carries upper and lower spaced arms 19a, the inner faces of which are recessed to form a seating for the spherical end 20a of a bar 20 which is provided with a handle 21. The bar 20 is adapted to slide within a tube 22 which has a shoulder 23 at that end remote from the handle 21. The tube 22 in turn passes through a sleeve 24 which, like the sleeve 16 of Figure 1, pivots about a vertical axis of a bracket 18, secured to the fixed frame 17 of the closure. The tube 22 carries a pin 25 while the sleeve 24 has a recess 26 at one end for the reception of the pin 25 when the tube 22 is withdrawn to its maximum extent into the sleeve 24. Thus the pin 25 prevents complete withdrawal of the tube 22 through the sleeve 24 in one direction and the shoulder 23 prevents complete withdrawal in the opposite direction.

In this construction the outer periphery of the bar 20 and the inner periphery of the tube 22 take the form shown in Figures 2 and 3, while the same applies to the outer periphery of the tube 22 and the inner periphery of the sleeve 24. In connection with Figure 3, it will be particularly noted that when the bar 14 and the sleeve 16 are in a locked position, the outer face of the bar and the inner face of the sleeve come into intimate surface contact with one another substantially throughout the extent thereof so that a reliable locking effect is obtained. This construction has a further advantage in that the wear due to locking and unlocking is small as compared with previously known constructions wherein the outer member or sleeve is locked with the inner member or bar along a line contact as distinguished from a surface contact.

In order to open the window the handle 21 is turned to permit the inter-engaging peripheries of the bar 20 and tube 22 and the inter-engaging peripheries of the tube 22 and the sleeve 24 to take up relative positions similar to that of the two elements shown in Figure 2. When the desired degree of opening of the window 11 has been effected the handle 21 is rotated in the reverse direction to cause frictional interlocking between the bar 20 and the tube 22, and between the tube 22 and the sleeve 24.

In this respect it will be appreciated that on displacement of the handle 21 in either direction the bar 20 is first angularly displaced relatively to the tube 22, whereupon on continued displacement of the handle 21, both the bar 20 and the tube 22 as a unit are angularly displaced relatively to the sleeve 24.

If desired, the bar 20 over a portion of its length only may be of the spiral form shown in Figure 2, that is to say over the remaining portion of its length it may be truly circular.

I declare that what I claim is:

1. An extensible casement stay for use in connection with a fixed frame and a casement movable relative to the frame, comprising, in combination, a bar pivotally attached to the casement and angularly displaceable about its own axis, and a sleeve embracing said bar and pivotally mounted on said frame, said bar and said sleeve having interengaging peripheral faces each provided with longitudinally extending radial steps, and said faces having a common axis irrespective of their relative rotation and being, in transverse section, eccentric to the said common axis and extending along like arcs of slightly increasing radii up to said steps for effecting surface contact between the faces of the bar and the sleeve on relative angular displacement between the bar and the sleeve about their common axis from a position in which the bar and the sleeve are capable of relative longitudinal displacement.

2. An extensible casement stay for use in connection with a fixed frame and a casement pivoted on said frame, comprising in combination, means pivotally attached to said casement, and means pivotally attached to said frame, both of said means having interengaging peripheral faces of like spiral form about a common axis for effecting a surface contact between said faces on relative angular displacement thereof about their common axis in one direction and for permitting relative longitudinal displacement thereof on angular displacement of the faces about a common axis in another direction.

3. A stay for use with a closure pivoted on a fixed frame, comprising a bar pivoted to said closure and angularly displaceable about its own axis relative thereto, a sleeve pivotally mounted on said fixed frame co-axial with said bar and adapted to embrace said bar, said bar and said sleeve having interengaging peripheral faces of like eccentricity with respect to the common axis of said bar and said sleeve, the said faces being of like spiral form in transverse section, and means for rotating said bar about the common axis of the bar and the sleeve for effecting angular displacement of the bar from a position in which it is adapted to slide longitudinally within the sleeve to a position in which it still remains on said common axis but with the faces of the bar and sleeve frictionally locked together by surface contact.

4. A stay for use with a closure pivoted on a fixed frame, comprising a bar having a pivotal joint connection with said closure, a tubular member embracing said bar and slidable relatively to said bar longitudinally of their common axis, a sleeve pivotally connected to said frame and embracing said tubular member, said bar and said tubular member having like interengaging peripheral faces and said tubular member and said sleeve having like interengaging peripheral faces having a common axis whereby, on relative angular displacement of the bar, the tube and the sleeve about the common axis from a position in which they are capable of relative longitudinal displacement, the bar, the tube and the sleeve are locked solidly by frictional surface contact between the cooperating faces and about the same common axis.

ABRAHAM DE VRIES.